United States Patent [19]
Akao et al.

[11] Patent Number: 6,002,856
[45] Date of Patent: Dec. 14, 1999

[54] SEMICONDUCTOR INTEGRATED CIRCUIT DEVICE

[75] Inventors: Yasushi Akao, Kokubunji; Kenichi Kuroda, Tachikawa, both of Japan

[73] Assignee: Hitachi, Ltd., Tokyo, Japan

[21] Appl. No.: 09/203,618

[22] Filed: Dec. 1, 1998

Related U.S. Application Data

[63] Continuation of application No. 08/769,188, Dec. 18, 1996, Pat. No. 5,900,008, which is a continuation of application No. 08/295,295, Aug. 24, 1994, abandoned.

[30] Foreign Application Priority Data

Oct. 14, 1993 [JP] Japan ................................ 5-282007

[51] Int. Cl.⁶ .................................................. G06F 17/60
[52] U.S. Cl. ..................................................... 395/500.02
[58] Field of Search ........................ 395/500.19, 500.18, 395/500.02

[56] References Cited

U.S. PATENT DOCUMENTS

| | | | |
|---|---|---|---|
| 4,402,044 | 8/1983 | McDonough et al. ............ | 395/500.02 |
| 4,651,307 | 3/1987 | Toumayan et al. . | |
| 4,802,119 | 1/1989 | Heene et al. . | |
| 4,860,254 | 8/1989 | Pott et al. . | |
| 4,947,477 | 8/1990 | Little . | |
| 4,974,208 | 11/1990 | Nakamura et al. . | |
| 5,031,144 | 7/1991 | Persky . | |
| 5,093,909 | 3/1992 | Saito . | |
| 5,136,540 | 8/1992 | Hayashi et al. . | |
| 5,214,300 | 5/1993 | Rohrer et al. . | |
| 5,270,967 | 12/1993 | Moazzami et al. . | |
| 5,283,907 | 2/1994 | Brauninger . | |
| 5,371,876 | 12/1994 | Ewertz et al. . | |
| 5,396,461 | 3/1995 | Fukumoto . | |
| 5,446,898 | 8/1995 | Bealkowski et al. . | |
| 5,452,467 | 9/1995 | May et al. .................... | 395/500.02 |
| 5,564,108 | 10/1996 | Hunsaker et al. . | |
| 5,581,724 | 12/1996 | Belsan et al. . | |
| 5,767,647 | 6/1998 | Akiyama et al. . | |
| 5,900,008 | 5/1999 | Akao et al. ....................... | 711/100 |

FOREIGN PATENT DOCUMENTS 61-51659 of 0000 Japan .

OTHER PUBLICATIONS

Shiozaki, Tadashi, "Applying Ferroelectric Thin Film to Integrated Circuits," Semiconductor World, Dec., 1991, pp. 122–125. (English translation also provided).

*Primary Examiner*—Kevin J. Teska
*Assistant Examiner*—Leigh Marie Garbowski
*Attorney, Agent, or Firm*—Beall Law Offices

[57] ABSTRACT

A semiconductor integrated circuit device comprising a one-chip microcomputer having a nonvolatile memory circuit to and from which write and read operations are carried out at high speed in keeping with the cycle time of the processor. Part of the memory circuit is set aside as a read-only area for accommodating a data processing program, and the rest of the memory is used to write and read data thereto and therefrom. With no need to optimize the assignments of the ROM and RAM parts in the memory circuit, the one-chip microchip is easy to design and manufacture with high productivity. With the program storage area established as desired, users enjoy more convenience use of the one-chip microcomputer than before.

4 Claims, 6 Drawing Sheets

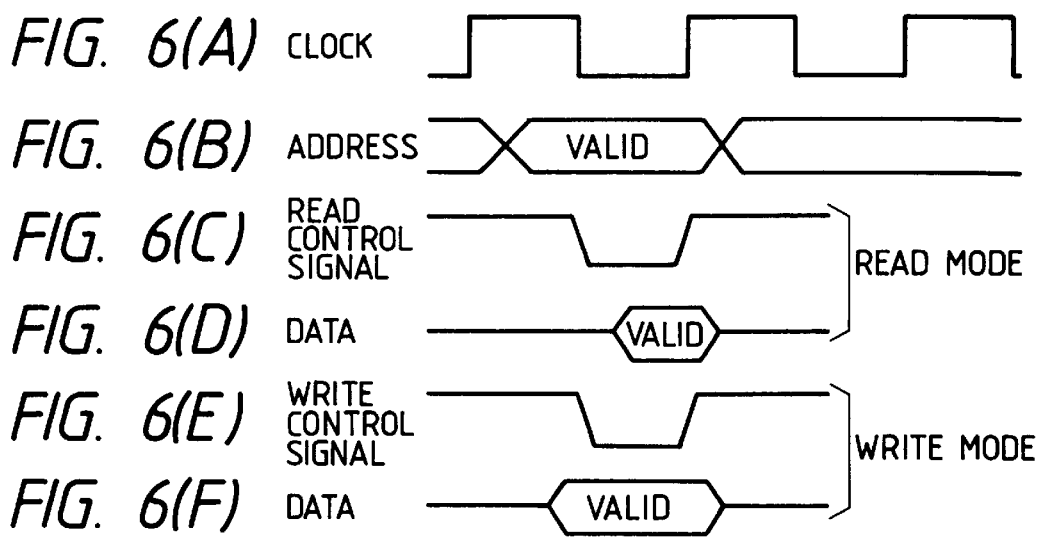
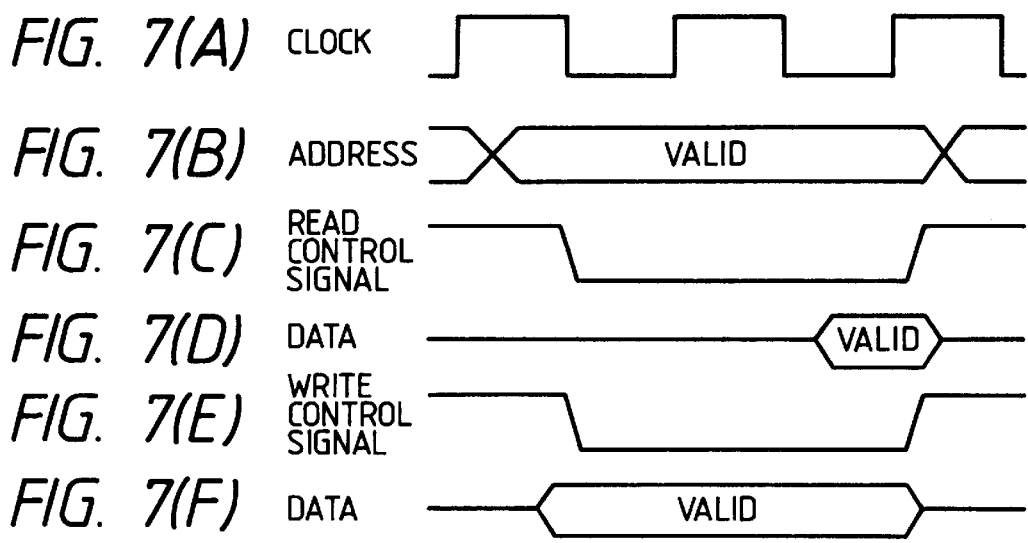

SEMICONDUCTOR INTEGRATED CIRCUIT DEVICE

This application is a continuation of U.S. application Ser. No. 08/769,188, filed on Dec. 18, 1996, now U.S. Pat. No. 5,900,008, which is a continuation of U.S. application Ser. No. 08/295,295 filed Aug. 24, 1994, now abandoned.

BACKGROUND OF THE INVENTION

The present invention relates to a semiconductor integrated circuit device and, more particularly, to techniques that may be applied advantageously to one-chip microcomputers.

Some conventional one-chip microcomputers comprise an EPROM (erasable programmable read only memory) to which data processing and system control programs are written once by general-purpose program writer so as to shorten the development time schedule of each microcomputer. One such one-chip microcomputer is described illustratively in Japanese Patent Laid-open No. Sho 61-51659.

A plurality of kinds of microcomputers are provided with EPROM's of different storage capacities for use in diverse applications. From the assortment of these microcomputers, a user selects an appropriate microcomputer having an EPROM of the suitable storage capacity needed to accommodate processing programs addressing the system in which the microcomputer is to be incorporated.

SUMMARY OF THE INVENTION

One-chip microcomputers are utilized in diverse applications. Thus the programs in the EPROM's of one-chip microcomputers differ significantly in size depending on the system to which each microcomputer is destined. In selecting a one-chip microcomputer, the user must make sure that the storage capacity of the memory is a little larger than the size of the programs to be accommodated. This requirement can promote a recent trend of program-storing EPROM's getting larger in their unused storage areas. Another recent trend is that growing quantities of data to be processed, combined with an increasing number of program steps stemming from more and more control functions required, often exceed the initially contemplated capacity of the incorporated EPROM. The latter case makes it unavoidable to remove some of the functions of low priorities from the microcomputer in question.

With a growing number of applications envisaged for one-chip microcomputers, microcomputer manufacturers are required to produce one-chip microcomputers of increasingly numerous specifications including the EPROM storage capacity. Under such circumstances, the number of units produced per product type is becoming smaller. Hence the problem of the manufacturers failing to enjoy the traditional benefit of cost reductions resulting from mass-producing semiconductor chips of limited kinds, a feature so characteristic of the conventional manufacture of semiconductor integrated circuit devices.

It is therefore an object of the present invention to provide a semiconductor integrated circuit device that is convenient to use and is manufactured with high productivity.

Other objects, features and advantages of the present invention will become apparent in the following specification and accompanying drawings.

The invention is outlined illustratively as follows: it envisages a semiconductor integrated circuit device constituted by a one-chip microcomputer that includes a nonvolatile memory circuit to and from which programs and data are written and read at high speed in keeping with the internal processor operating in real time. In the memory circuit, the area for accommodating data processing programs is used as a read-only area, and the remaining area is used for writing and reading data thereto and therefrom.

Given the above arrangements, the inventive semiconductor integrated circuit device is easy to manufacture with high productivity because it eliminates the need for optimally dividing the ROM and RAM storage capacities during manufacture. Furthermore, the inventive device is more convenient to use than ever because it allows the program storage area to be set as desired by the user.

BRIEF DESCRIPTION OF THE DRAWINGS

FIGS. 6 (A) through 6 (F) are waveform charts describing a typical bus cycle of the FRAM in FIG. 3;

FIGS. 7 (A) through 7 (F) are waveform charts showing the bus cycle of the FRAM in FIG. 3 with respect to peripheral devices.

DESCRIPTION OF THE PREFERRED EMBODIMENTS

Figure 1:
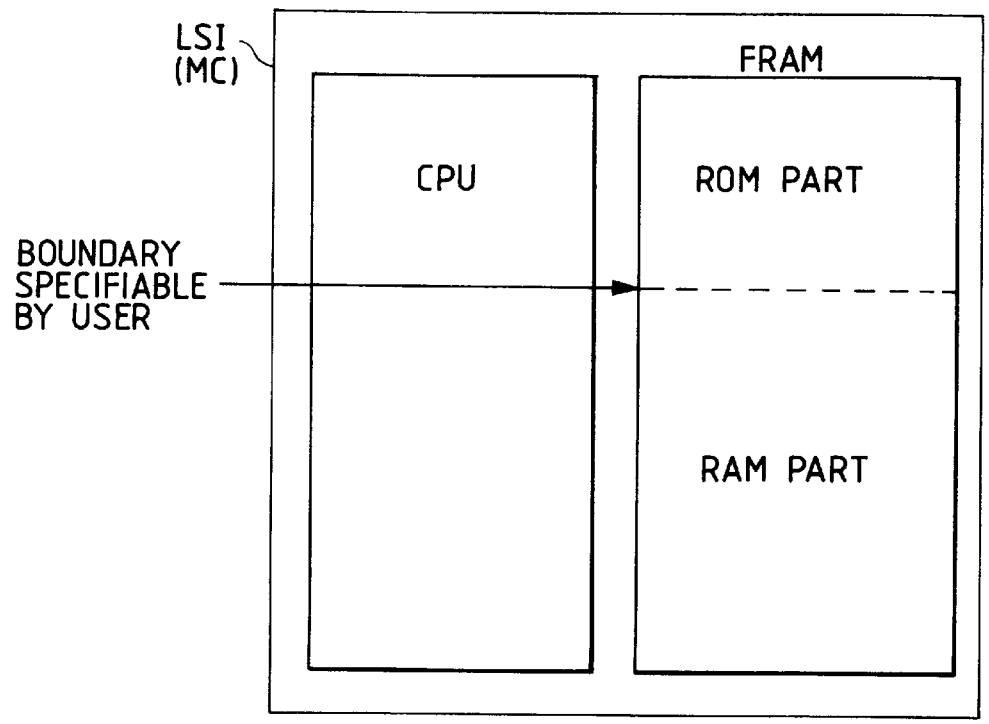
FIG. 1 is a block diagram showing conceptually a one-chip microcomputer embodying the invention.

FIG. 1 is a block diagram showing conceptually a one-chip microcomputer embodying the invention. For a better understanding of the invention, the figure illustratively shows two principal components: a central processing unit (CPU, or simply called the microprocessor hereinafter) and a memory circuit. The memory circuit stores programs that order the microprocessor to process data and control a target system, and the data to be processed.

In the one-chip microcomputer of the above constitution, a ROM (read only memory) accommodating the programs needs to be accessed for high-speed read operations in keeping with the cycle time of the microprocessor. Likewise, a RAM (random access memory) to be incorporated in the chip should also be accessed for high-speed write and read operations in accordance with the cycle time of the microprocessor.

The inventors of this invention took notice of the fact that the RAM based on a ferroelectric capacitor arrangement (simply called the FRAM hereinafter) has two aspects of use: the FRAM can be used as a ROM because it acts as a nonvolatile memory depending on the polarity of the ferroelectric material used; the FRAM also acts as a dynamic RAM to which programs or data may be written at high speed. The inventors then came up with the idea of using the FRAM as the memory circuit in the one-chip microcomputer.

As shown in FIG. 1, the inventive one-chip microcomputer comprises one microprocessor (CPU) and one memory FRAM. Part of the FRAM is used as a ROM and the rest as a RAM. The boundary between the ROM and the RAM may be designated as desired by the user. As will be described later, it is a significant feature of this embodiment that the user is able to finalize the boundary between the ROM and the RAM at system debugging time.

Figure 2:
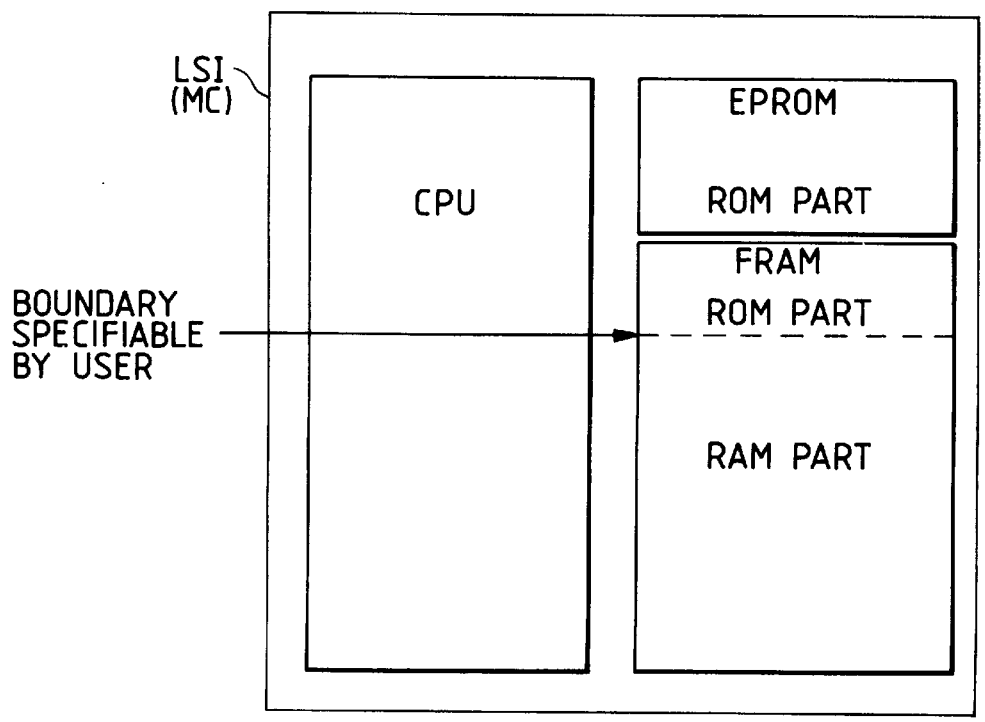
FIG. 2 is a block diagram conceptually showing a one-chip microcomputer alternatively embodying the invention.

FIG. 2 is a block diagram conceptually showing a one-chip microcomputer alternatively embodying the invention. Every one-chip microcomputer needs a memory circuit that accommodates programs. This embodiment incorporates an EPROM that is set beforehand for use as the ROM. In this arrangement, the EPROM is assigned a relatively small memory capacity.

The embodiment of FIG. 2 incorporates an FRAM similar to that of the embodiment of FIG. 1 in order to deal with cases where the number of program steps has exceeded the capacity of the EPROM. Part of the FRAM is used as a ROM storing those program parts that have exceeded the storage limit of the EPROM. The rest of the FRAM is employed as a RAM. The boundary between the ROM and the RAM is designated as desired by the user. As will be explained later, it is also a significant feature of this alternative embodiment that the user is able to finalize the boundary between the ROM and the RAM at system debugging time.

There exist EEPROM's (electrically erasable programmable read only memories) using MNOS transistors as memory cells, and EEPROM's employing FLOTOX memory cells. These EEPROM's may each be used both as a ROM and as a RAM in functional terms. But when it comes to using an EEPROM as a RAM, the time required for write operations thereto is disproportionately longer than the time for read operations therefrom. Thus the EEPROM is virtually impractical if used as the RAM for temporary data storage.

The ROM incorporated in the one-chip microcomputer must be accessed for high-speed program reading in keeping with the cycle time of the microprocessor (CPU). The RAM included in the one-chip microcomputer is used temporarily to accommodate intermediate data and other resources generated halfway through program execution. As such, the RAM must be accessed for high-speed write and read operations thereto and therefrom also in accordance with the cycle time of the microprocessor.

The FRAM provides the functions of both the ROM and the RAM to be incorporated in the one-chip microcomputer as outlined above. The memory area of the FRAM is divided suitably into two parts, one part being used as a ROM and the other part as a RAM.

Where the above-described constitution is adopted, a plurality of conventional one-chip microcomputers with different ROM-RAM capacity combinations may be replaced by a single one-chip microcomputer. In other words, the inventive one-chip microcomputer alone provides the functions of multiple conventional one-chip microcomputers. The manufacturer producing the novel one-chip microcomputer thus enjoys the benefit of higher chip productivity than before. Another benefit for the manufacturer is a significantly simplified structure of product management from manufacture to shipment.

Figure 3:
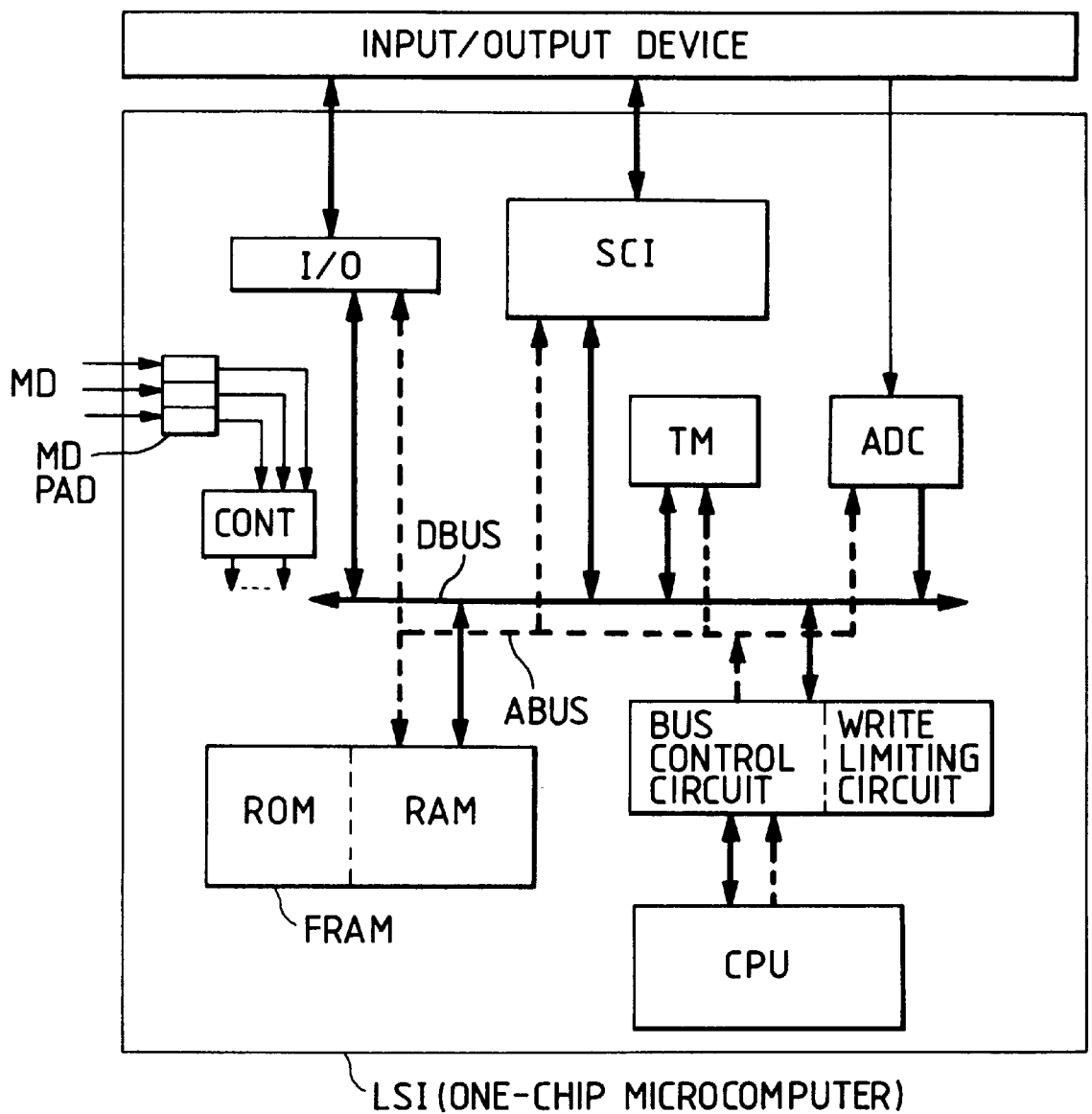
FIG. 3 is a block diagram outlining the constitution of the one-chip microcomputer according to the invention.

FIG. 3 is a block diagram outlining the constitution of the one-chip microcomputer (MC) according to the invention. Each of the circuit blocks making up the figure is formed by known semiconductor integrated circuit production techniques on a single semiconductor substrate made illustratively of single crystal silicon.

The one-chip microcomputer LSI of FIG. 3 comprises a central processing unit CPU (microprocessor), a bus control circuit, a ferroelectrics RAM (simply called the FRAM), a serial communication interface SCI, a timer TM, an analog-digital converter ADC, peripheral circuits such as an input/output circuit I/O, and a control circuit CONT.

In this microcomputer LSI, the control program to be executed by the CPU is written in a ROM allocated in the FRAM. Mode designation is accomplished by controlling a mode signal MD destined to a mode signal input terminal MDPAD. A data bus DBUS provides data transfer among the CPU, input/output circuit I/O, serial communication interface SCI, timer TM, analog-digital converter ADC and ferroelectrics RAM. The CPU processes data and controls the target system in accordance with the control program held in the ROM part of the FRAM.

The input/output circuit I/O, serial communication interface SCI and analog-digital converter ADC interface data with an I/O device. Through an address bus ABUS, the CPU addresses the FRAM, input/output circuit I/O, serial communication interface SCI, timer TM and analog-digital converter ADC.

Besides arbitrating bus acquisition, the bus control circuit is provided with, but not limited by, a write limiting function for detecting the addresses assigned to the ROM part so that the CPU will be prevented from performing write operations to the ROM upon access to the FRAM. That is, the write limiting function protects the data and control program in the ROM from destruction by inadvertent write operations attempted to that part. In other words, although the erasable FRAM is used, a specific part of it is made to function effectively as a non-erasable ROM.

The rest of the FRAM is allocated as the RAM. Where the microcomputer LSI is supplemented with an I/O device and is incorporated in the target system, the RAM part of the FRAM is used as a temporary data storage area under control of the CPU. When the FRAM is used as a memory circuit incorporated in a one-chip microcomputer, with part of the memory used as the ROM and the rest as the RAM, the microcomputer serves as a highly versatile general-purpose one-chip microcomputer.

From the manufacturer's point of view, the above-described one-chip microcomputer of high versatility is easier to produce in large quantities than other customized chips. On the user's part, the one-chip microcomputer is convenient to use because it allows its ROM capacity to be set as desired. Illustratively, when the specifications of the target system are determined, the user may select a microcomputer having the necessary storage capacity. This makes it possible for the user's personnel to perform software design in parallel with hardware design. The program is debugged when the microcomputer board is manufactured. If the initial number of program steps has been increased by that time with the modifications or additions made to the program as a result of the debugging, the ROM part of the FRAM may be expanded to accommodate the excess program steps.

Figure 4:
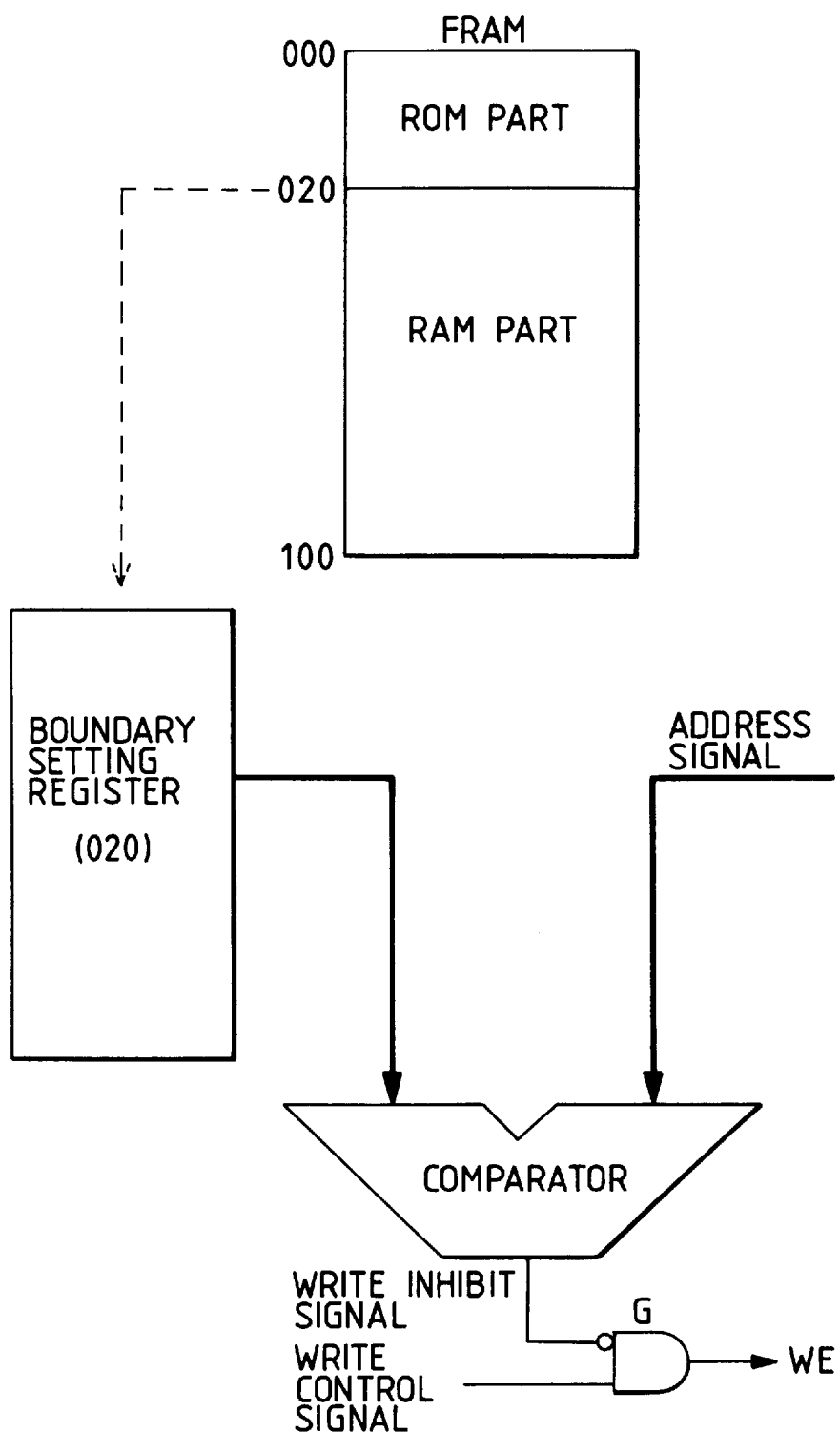
FIG. 4 is a conceptual view depicting how access to a memory circuit FRAM in FIGS. 1 through 3 is controlled.

FIG. 4 is a conceptual view depicting how access to the above memory circuit FRAM is controlled. For easy comprehension, it is assumed that the FRAM of FIG. 4 has addresses 000 through 100 and that addresses 000 through 020 constitute the ROM part and 021 through 100 make up the RAM part.

When the area designated by addresses 000 through 020 is used as the ROM, address 020 is set in a boundary setting register. The address placed in the boundary setting register is supplied to one of the two inputs of a comparator. The other input of the comparator is fed with an address signal. The two addresses are compared by the comparator for magnitude.

The comparator is composed of, but not limited to, a subtractor. The subtractor subtracts address Ai designated by the address signal from address 020 set in the boundary setting register. If the result of the subtraction is positive (020≧Ai), a write inhibit signal WIH is set to logical 1; if the result is negative (020<Ai), the write inhibit signal WIH is set to logical 0.

The write inhibit signal WIH is inverted and sent as a control signal to one of the two inputs of an AND gate circuit G. The other input of the AND gate circuit G is supplied with a write control signal. When the input address signal is such that 020≧Ai, the write inhibit signal WIH is set to logical 0. This brings an output signal WE Low regardless of the write control signal. In that case, even if the write control signal is brought High, the write inhibit signal WIH keeps the output signal WE forcibly at the Low level and thus no write operation is performed to the FRAM. If the input address signal is such that 020<Ai, the write inhibit signal WIH is set to logical 1. This causes the write control signal to be output via the AND gate circuit G, allowing the FRAM to be accessed for a write operation as per the write control signal.

Although the comparator above has been illustratively described in the form of a subtractor, it is actually composed of an addition circuit adapted to carry out subtract operations. This is common knowledge in the art, and the foregoing description has simply cited the subtractor for illustrative purposes.

The boundary setting register, the comparator and the gate circuit constitute a write limiting circuit which is located in, but not limited to, the bus control circuit of FIG. 3. If the CPU inadvertently outputs an address signal and a write control signal destined to the ROM part of the FRAM, the write limiting circuit prevents the bus control circuit from outputting the write control signal designating a write operation. The FRAM is not accessed for the write operation and is thus protected against program destruction.

Alternatively, write checks may be performed to detect erroneous data write operations. Furthermore, the write inhibit signal WIH may also be transferred to the CPU for quick error processing.

Figure 5:
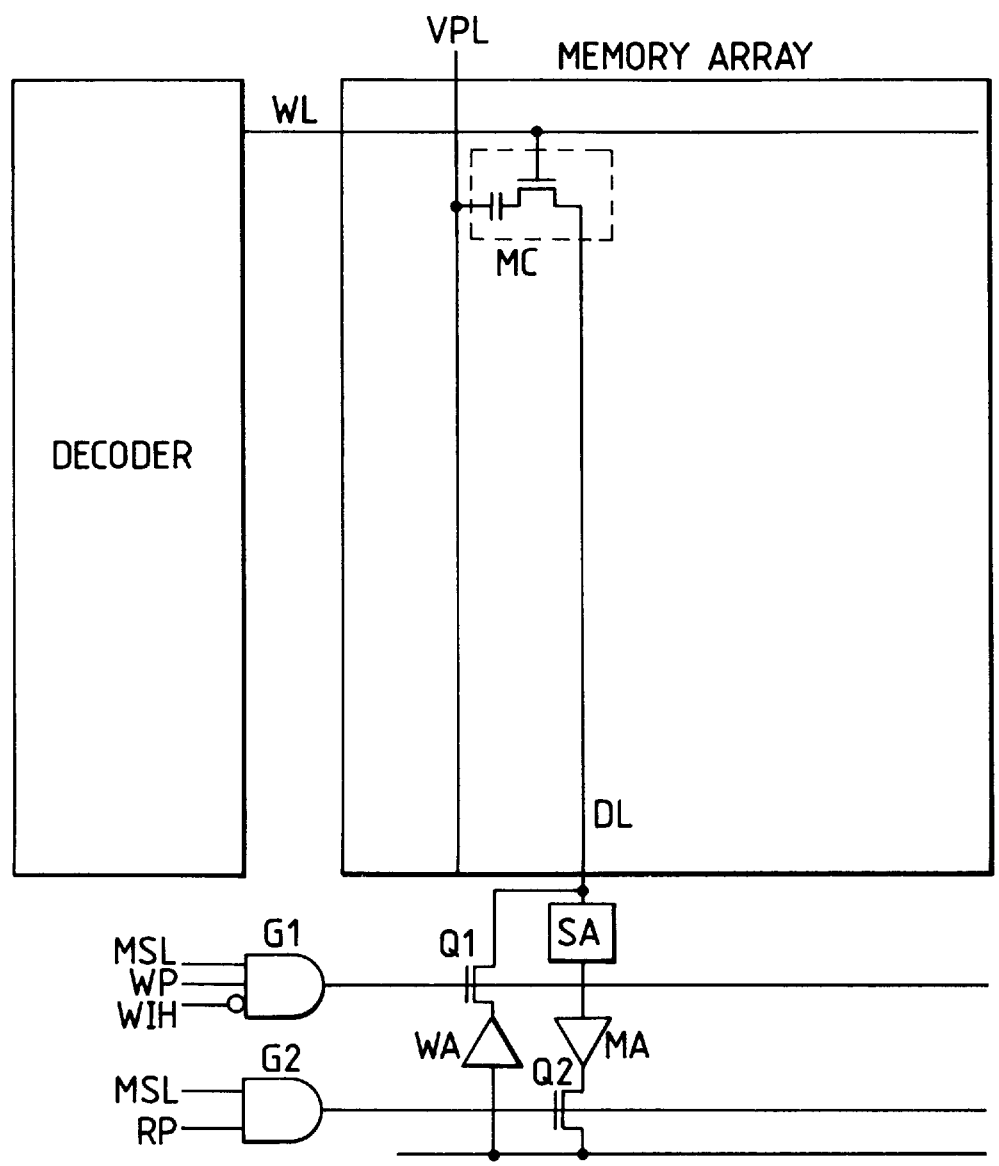
FIG. 5 is a schematic circuit diagram of a typical FRAM for use with this invention.

FIG. 5 is a schematic circuit diagram of a typical FRAM for use with this invention. This FRAM is a memory circuit comprising memory cells similar to those of dynamic RAM's. Specifically, the memory cells are made up of MOSFET's for address selection and capacitors for information storage. The information storing capacitors are ferroelectric capacitors. The supplied plate voltage VPL of the ferroelectric capacitors is to be high enough to alter the polarity of the capacitors relative to data lines DL upon write operation to effect nonvolatile storage.

The memory array is similar in structure to, but not limited by, that of known dynamic RAM's. Although FIG. 5 shows a simple data line (or bit line) DL as an example, the line is in fact a loop-back bit line made of a pair of complementary data lines arranged in parallel with a sense amplifier SA. The ferroelectric capacitors are each composed of a ferroelectric material such as PZT deposited by known techniques on top of an electrode constituting a capacity storage node of a dynamic memory cell. On the electrode covered with the ferroelectric material layer is further formed an upper electrode composed of materials such as Pt. The ferroelectric material may alternatively be composed of $BaMgF_4$. How the ferroelectric layer is formed is illustratively described in detail in "Semiconductor World," December, 1991, pp. 122–125.

Unlike ordinary dynamic RAM's, the RAM part of this FRAM is equipped with column switches Q1 and Q2 for write and read operations. The column switch for the write operation is controlled not only by an address selection signal MSL and write signal WP but also by the output signal from a gate circuit G1 to which the write inhibit signal WIH is supplied.

Suppose now that the gate circuit G1 is fed with a selection signal MSL and a write signal WP, the selection signal MSL being generated by decoding the address signal for selecting the data line DL, the write signal WP designating a write operation. In that case, setting the write inhibit signal WIH to logical 1 for designating the write operation forces the gate circuit G1 to close its gate. This puts the selected data line DL in the high-impedance state and inhibits the write operation. On the other hand, the column switch for the read operation is controlled by the output signal from a gate circuit G2 that receives a selection signal MSL and a read signal RP. Thus the read operation when designated is performed without constraints.

Usually, if no write operations are attempted from the outside to the ROM part of the FRAM over the data line DL, the ROM part does not accumulate the charges commensurate with the potential level. The level of read operations for refresh purposes is then determined according to the polarity of the ferroelectric capacitors. As long as read operations are carried out while the write operation is being inhibited, the polarity of the ferroelectric capacitors remains unchanged. The possibility of the direction of the polarity getting altered emerges when part of the area currently used as the RAM is to be brought back to the FRAM. To get a RAM part back to the FRAM requires varying the plate voltage VPL of the ferroelectric capacitors involved. Here, it is difficult effectively to keep unchanged the plate voltage of that memory part alone which is to be used as the ROM. This is because the ROM part is programmed by the user whereas the power lines for supplying the plate voltage cannot be divided correspondingly. Thus with this embodiment, a read operation equivalent to the refresh operation is carried out to bring unfailingly the storage nodes to the potential level commensurate with the storage level. The desired part is then brought to the FRAM. This ensures the kind of rewrite operation which maintains reliably the same polarity for the ROM part.

As with ordinary dynamic RAM's, a column switch may be used commonly for, but not limited to, both read and write operations. In that case, the write inhibit signal WIH is arranged to restrict the operation of a write circuit WA. That is, regardless of the column switch being selected or not, the write operation will not be performed as well if the write inhibit signal WIH puts the output of the write circuit WA in the high-impedance state.

FIGS. 6 (A) through 6 (F) are waveform charts describing a typical bus cycle of the above-described FRAM. An address signal is output in synchronism with each clock cycle of the CPU. In read mode, a read control signal is set to the active level (low level) so that the data read from the appropriate memory cell is output. In write mode, a write control signal is set to the active level (low level) so that data is written to the selected memory cell.

In this manner, the FRAM is accessed for read or write operations in the bus cycle in synchronism with the clock pulses from the CPU. As a result, the program is read quickly from the ROM part for high-speed data processing. Intermediate data is written to and read from the RAM part rapidly so that data processing and the system control operation are carried out at high speeds.

FIGS. 7 (A) through 7 (F) are waveform charts showing the bus cycle of the FRAM with respect to peripheral devices. Since the peripheral devices have relatively low operation speeds, they are accessed for a read or a write operation in a correspondingly long bus cycle, e.g., in a bus cycle corresponding to two clock cycles of the CPU. The effect of the prolonged bus cycle on the overall performance is negligible because the peripheral devices are not frequently accessed for read or write operations.

Figure 8:
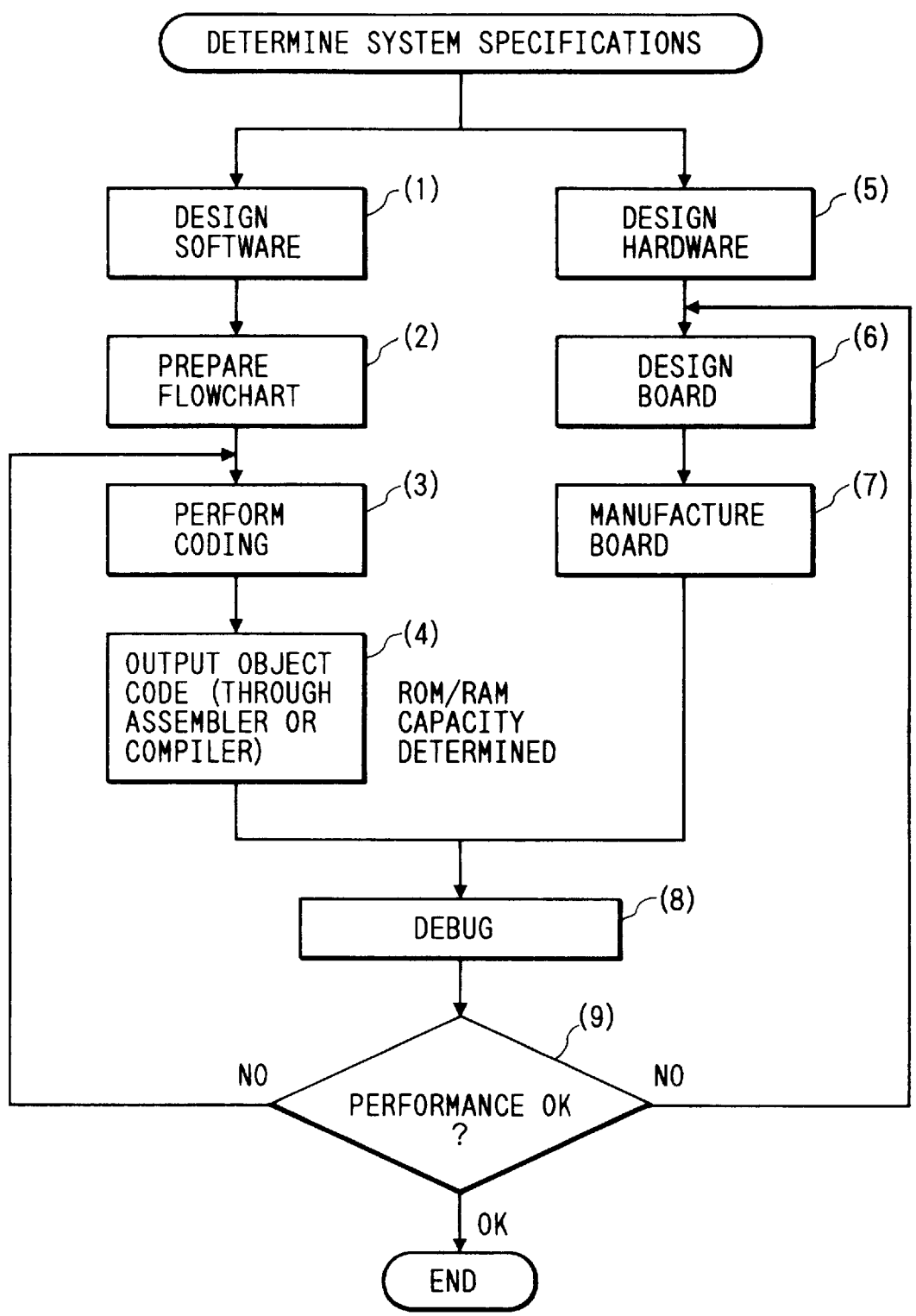
FIG. 8 is a flowchart of steps for developing a system comprising the one-chip microcomputer according to the invention.

FIG. 8 is a flowchart of steps for developing a system comprising the one-chip microcomputer according to the invention. Development of the microcomputer is initiated following determination of the specifications for the target system.

With the system specifications established, the approximate scope of the system is determined accordingly. This in turn makes it possible to select the kind of one-chip microcomputer to be used with the target system. Specifically, what is selected here is the one-chip microcomputer incorporating an FRAM that provides the total capacities of the ROM and RAM parts accommodating the necessary program and the data to be processed.

With the use of the above-selected one-chip microcomputer set as the precondition for development, the design and manufacture of the hardware carried out in steps (5) through (7) below will proceed in parallel with software design in steps (1) through (4), as will be described in detail below.

In step (1), software design is started. In step (2), a flowchart of the software is created. In step (3), coding is carried out. In step (4), the coded program is translated by assembler or by complier into machine language of the CPU. That is, an object code output is effected. At this point, the ROM part of the FRAM is set aside and the rest is allocated as the RAM part.

In step (5), meanwhile, hardware design is initiated. In step (6), board design is carried out in connection with the hard design of step (5). In step (7), a microcomputer board is manufactured. That is, on the board are mounted various electronic parts making up the I/O device as well as the semiconductor integrated circuit device constituting the one-chip microcomputer.

The object code created in step (4) is stored into the ROM part by the above-described write operation executed to the FRAM. Debugging is carried out in step (8) using the control program thus prepared. In step (9), a check is made to see if desired data processing and the system control operation are effected as required.

If the program is found to be inadequate, step (3) is reached again in which modifications or additions to the program are carried out. These modifications or additions may result in an increased number of program steps in step (4). If that is the case, the excess program capacity is readily accommodated by simply increasing the capacity of the ROM part.

If the hardware is found to be inadequate, step (6) is reached again for another board design procedure. Changes in the hardware in step (6) proceed in parallel with the board manufacture of step (7). If both the software and the hardware are found amiss, the two aspects of the object under development are modified and changed accordingly in parallel.

As described, the FRAM that permits changes in capacity to its ROM and RAM parts makes it possible to deal flexibly with increases or decreases that may occur in the number of program steps. This allows the software and hardware development stages to proceed in parallel. Because it is possible, as with the embodiment above, to select the type of one-chip microcomputer when the system specifications have been determined, hardware design, board design and board manufacture can start much earlier than is conventionally feasible. The developed program is written (i.e., transported) to the ROM part of the FRAM, whereby the one-chip microcomputer is set in motion.

When the above debugging stage has confirmed the performance of the product as adequate, the boundary address between the ROM and the RAM part is written in the boundary setting register to protect the ROM part against destruction. If the boundary setting register is an erasable nonvolatile memory, the boundary address is rewritten every time a new program is written in step (5).

The major benefits of the above-described embodiments are as follows;

(1) The one-chip microcomputer is arranged to include a nonvolatile memory circuit to and from which write and read operations are performed at high speed in keeping with the cycle time of the processor. In the memory circuit, the area for accommodating the data processing program is set aside as a read-only area, and the rest is used to write and read data thereto and therefrom. Because it is not necessary to take into account the optimum assignments of the ROM and RAM parts in its memory circuit, the one-chip microcomputer is easy to design and manufacture with high productivity. In addition, product management of the microcomputer is easy to carry out. With its program storage area set as desired, the one-chip microcomputer affords the user more convenient use than ever before.

(2) The features of (1) above allow the software and hardware aspects of system development to proceed in parallel. Given the fact that the program is written electrically in the memory circuit, the time required to develop the system in conjunction with development of the one-chip microcomputer is minimized.

Although the description above contains many specificities, these should not be construed as limiting the scope of the invention but as merely providing illustrations of some of the presently preferred embodiments of this invention. For example, the memory cell structure for high-speed read and write operations in synchronism with the clock pulses of the CPU may be other than that of the above-described FRAM.

This invention may be applied extensively to semiconductor integrated circuit devices such as one-chip microcomputers for performing specifically defined data processing, system control and process control according to programs.

To sum up, the inventive semiconductor integrated circuit device comprises a one-chip microcomputer having a nonvolatile memory circuit to and from which write and read operations are carried out at high speed in keeping with the cycle time of the processor. Part of the memory circuit is set aside as a read-only area for accommodating the data processing program, and the rest of the memory is used to write and read data thereto and therefrom. With no need to optimize the assignments of the ROM and RAM parts in the memory circuit, the one-chip microcomputer is easy to design and manufacture with high productivity. Product management of the microcomputer is easy to carry out and, with the program storage area set as desired, users enjoy more convenience use of the one-chip microcomputer than ever before.

What is claimed is:

1. A method of developing a microcomputer which is formed in a single chip and includes a processor and a nonvolatile memory circuit coupled to the processor, comprising the steps of:

provinding an object code representing software to be stored in the nonvolatile memory;

determining a size of an area to be allocated as a nonvolatile memory in the nonvolatile memory circuit in accordance with an amount of the object code provided by the providing step;

writing the object code to the area to be allocated as the nonvolatile memory; and setting the size determined by the determining step to a designation circuit which is included in the microcomputer and which designates the area in the nonvolatile memory circuit as the nonvolatile memory, wherein a different area in the nonvolatile memory circuit is allocated as a volatile memory.

2. A method of developing a microcomputer according to claim 1, further comprising the steps of:

debugging the microcomputer before the setting step;

providing another object code if a change of the object code is determined in the debugging step; and performing the determining step and the writing step.

3. A method of developing a microcomputer according to claim 2, further comprising the step of:

designing hardware to be connected to the microcomputer in parallel with the providing step, determining step and writing step.

4. A method of developing a microcomputer according to claim 3, wherein the designing step includes the steps of:

designing a board; and manufacturing the board.

* * * * *